United States Patent [19]

Bucci

[11] Patent Number: 4,458,770
[45] Date of Patent: Jul. 10, 1984

[54] PLATFORM SCALE WITH VARIABLE CAPACITANCE TRANSDUCER

[75] Inventor: George Bucci, Tolland, Conn.

[73] Assignee: Newell Companies, Inc., Freeport, Ill.

[21] Appl. No.: 414,297

[22] Filed: Sep. 2, 1982

[51] Int. Cl.³ .......................... G01G 3/14; H01G 7/00
[52] U.S. Cl. ................................ 177/210 C; 361/283
[58] Field of Search ................... 177/210 C; 361/278, 361/283, 288; 73/862.64

[56] References Cited

U.S. PATENT DOCUMENTS

| | | | |
|---|---|---|---|
| 3,966,002 | 6/1976 | Schneider | 177/256 |
| 4,051,721 | 10/1977 | Williams | 73/141 |
| 4,158,396 | 6/1979 | Suzuki et al. | 177/210 |
| 4,191,268 | 3/1980 | Miyoshi et al. | 177/210 |
| 4,325,102 | 4/1982 | English | 361/288 |

*Primary Examiner*—George H. Miller, Jr.

*Attorney, Agent, or Firm*—Leydig, Voit, Osann, Mayer & Holt, Ltd.

[57] ABSTRACT

A platform scale in which the force applied to the platform is transmitted to a capacitance transducer whereby the output of the transducer is correlated to the force on the platform. The transducer includes two parallel square plates spaced apart and insulated from each other. Each plate has four slots, one projecting inwardly from each edge of each plate and each slot being generally parallel to the adjacent edge whereby each plate has four identical cantiliver beams. The free ends of each beam of one plate are connected to but insulated from the free ends of the corresponding beams of the other plate. The space between the plates constitutes the dielectric of the transducer and this space is reduced by an amount virtually correlated to the force applied to the platform so that the output of the transducer is very closely correlated to the force applied to the platform on the scale.

6 Claims, 9 Drawing Figures

PLATFORM SCALE WITH VARIABLE CAPACITANCE TRANSDUCER

BACKGROUND OF THE INVENTION

The present invention relates to platform scales and especially to scales which commonly are known as bathroom scales. More particularly, the invention relates to a platform scale where the force applied to the platform changes the capacitance of a capacitance transducer and the change in capacitance produces a read-out which indicates the magnitude of the force applied to the platform.

SUMMARY OF THE INVENTION

The general object of the present invention is to provide in a platform scale a capacitance transducer which basically eliminates the problems of hysteresis, which is comparatively simple and inexpensive to manufacture and assemble, and which has a high degree of linearity between the force applied to the platform of the scale and the output of the transducer.

More specifically, the basic object of the invention is to achieve the foregoing through the use of two insulated capacitance plates which are identical in size and shape, which is polygonal with all side edges of each plate being equal in length, which has a plurality of slots with a slot opening through each edge of the plate and generally parallel to the adjacent edge to form a plurality of cantilever beams on each plate, and by connecting the free ends of the beams of one plate with the free ends of the beams on the other plate while insulating the plates from each other whereby the space between the plates constitutes the dielectric of the transducer and that space changes virutally in a linear relation with the force applied to the platform of the scale.

The invention also resides in the details of the novel construction and arrangement of the capacitance transducer.

DETAILED DESCRIPTION OF THE PREFERRED EMBODIMENTS

Figure 1:
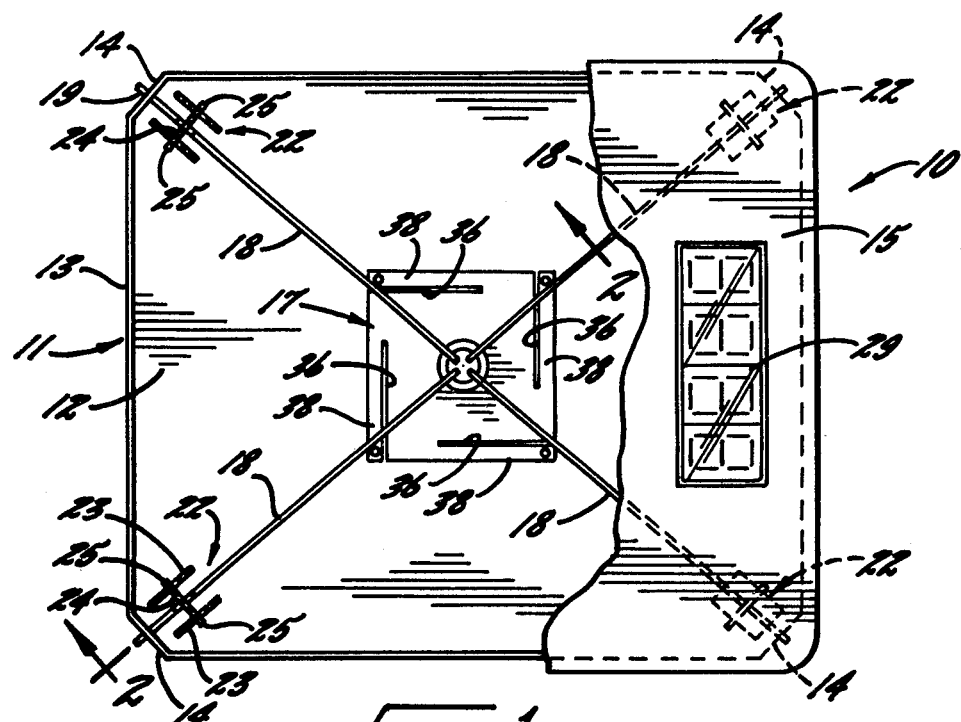
FIG. 1 is a top plan view of a platform scale embodying the present invention, parts being broken away and shown in section.
Figure 2:
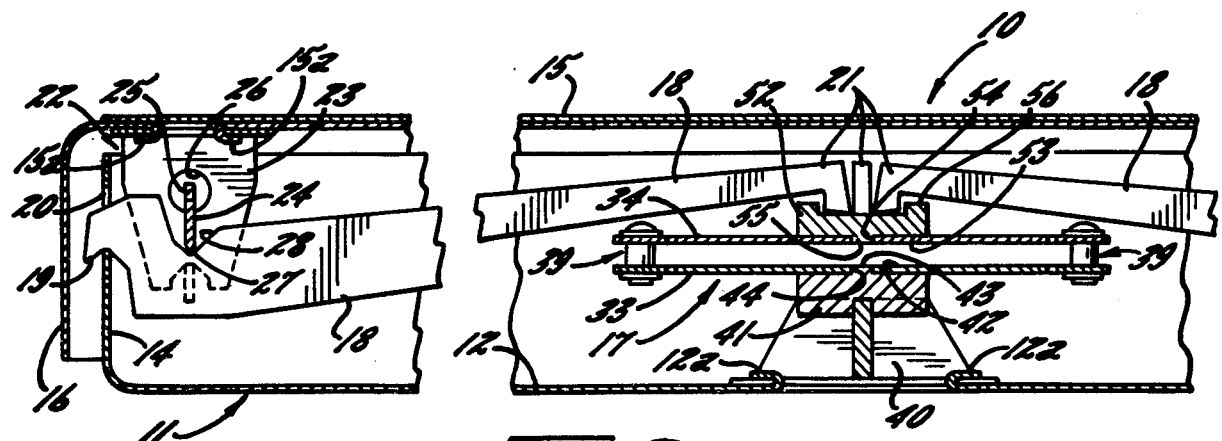
FIG. 2 is an enlarged fragmentary sectional view taken along the line 2—2 in FIG. 1.
Figure 3:
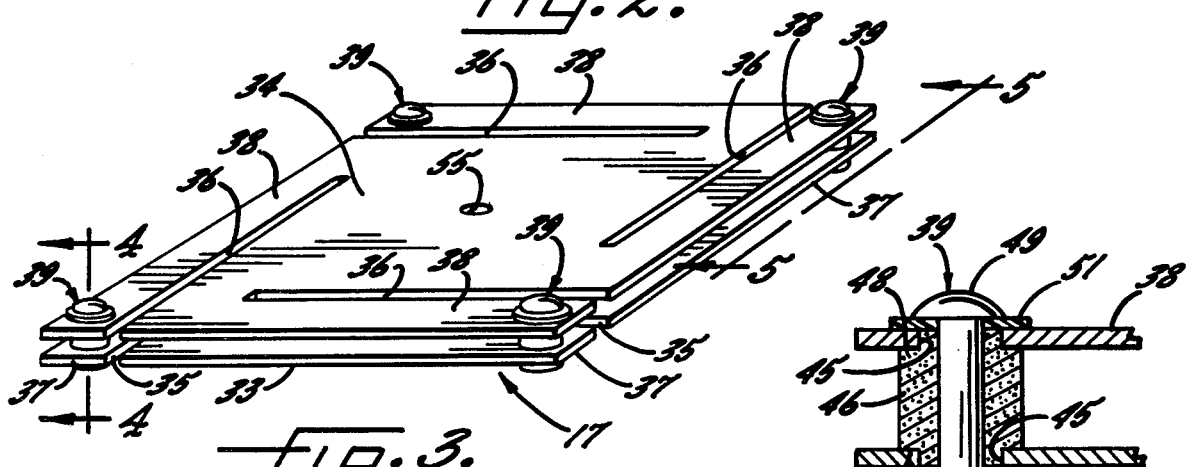
FIG. 3 is a perspective view of the capacitance transducer.
Figure 4:
FIG. 4 is an enlarged fragmentary sectional view taken along the line 4—4 in FIG. 3.

As shown in the drawings for purposes of illustration, the invention is embodied in a platform scale 10 of the type commonly called a bathroom scale. The latter includes a sheet metal base 11 with a generally square bottom wall 12 and upstanding side walls 13 connected by short corner walls 14. Above the base is a generally square horizontal platform 15 formed with an integral skirt 16 which projects downwardly and is spaced outwardly of the side and corner walls 13 and 14. A force applied to the platform is transmitted to a capacitance transducer assembly 17 mounted on the base at the center thereof and, for this purpose, the platform is supported on the base through the medium of four identical levers 18. One lever is fulcrumed on each corner wall 14 by means of a hook position 19 (FIG. 2) projecting through a hole 20 in the wall. The levers 18 extend diagonally inward and their inner end portions 21 bear on the transducer. On the underside of the platform at each corner thereof is a bracket 22 which is rigidly attached to the platform by ears 15a struck down from the platform and which includes parallel depending legs 23. A flat loading link 24 is carried by each bracket 22 between the legs thereof by ears 25 which project from the sides of the link and into holes 26 in the legs. The underside of each link 24 is formed with a notch 27 which is seated in an upwardly opening notch 28 formed in each lever 18 inwardly of the hook 19. Thus, any force on the platform 15 is transmitted to the levers 18 through the brackets 22 and the links 24 and causes the levers to be urged downwardly and this applies a downward force to the transducer 17.

Figure 9:
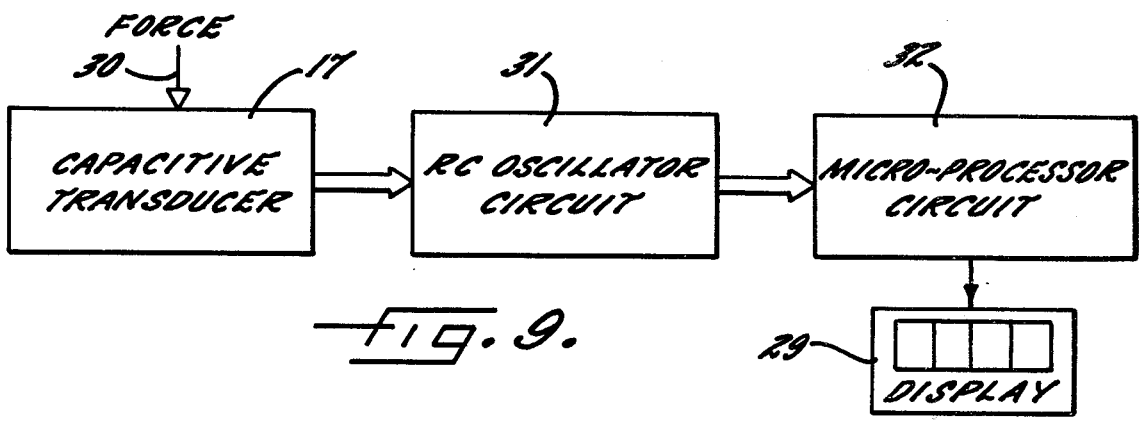
FIG. 9 is a schematic view of the circuit used to produce a display which corresponds to the output of the transducer and hence to the force applied to the platform of the scale.

The force applied to the transducer 17 changes the capacitance of the latter in proportion to the magnitude of the force applied to the platform 15 and this change in capacitance is used to show the magnitude of the force applied to the platform on a display panel 29 which preferably is a digital display. As shown schematically in FIG. 9, the force 30 applied to the transducer 17 changes the capacitance of the latter and the output of the transducer is fed to an RC oscillator circuit 31. The latter circuit 31 feeds a micro-processor circuit 32 which operates the digital display 29. Such circuits are well-known in the art and examples are shown in Schneider U.S. Pat. No. 3,966,002, Williams U.S. Pat. No. 4,051,721, Suzuki et al. U.S. Pat. No. 4,158,396 and Miyoshi et al. U.S. Pat. No. 4,191,266.

The present invention contemplates the provision of a novel capacitance transducer 17 which has little or no hysteresis effect, which has a high degree of linearity between the magnitude of the force applied to the platform 15 and the output of the transducer and which is relatively inexpensive to manufacture and assemble. To these ends, the transducer basically is composed of two spaced parallel plates 33 and 34 which are identical and which are polygonal in shape with all sides of each plate being equal in length. The plates are formed with a plurality of slots 35 and 36 equal in number to the sides of the plate with one slot opening through each side edge of the plate and being generally parallel to the adjacent side edge. Each slot is shorter than the corresponding adjacent edge so that the slots form on each plate a plurality of identical fingers or cantilever beams 37 and 38 equal in number to the sides of the plate. Fasteners 39 connect the free ends of the beams 37 on the plate 33 to the free ends of the corresponding beams 38 on the plate 34 and the plates are insulated from each other so that the space between the plates constitutes the dielectric of the transducer. Thus, when a force is applied to the platform 15, the levers 18 apply a corresponding force 30 to the plate 34 and the latter force bends the beams 37 and 38 to change the spacing between the plates 33 and 34. This change in spacing is virtually proportional to the magnitude of the force applied to the platform and, accordingly, the output of the transducer also is virtually proportional to that force.

In the form shown in FIGS. 1 through 7, the plates 33 and 34 are square and disposed in spaced horizontal planes with the plate 33 being beneath the plate 34. An upstanding bracket 40 (FIG. 2) is rigidly attached to the bottom wall 12 of the base 11 at the center thereof by ears 12a struck up from the bottom wall. The bracket includes a support part 41 with an upwardly facing horizontal surface 42. The latter is the support for the lower plate 33 which is centered relative to the base by a cylindrical boss 43 which projects up through a hole 44 in the center of the plate 33 and which is centered relative to the base 11. The edges of the plates and the slots 35 and 36 are straight so that the beams 37 and 38 are rectangular in shape. The fastening elements 39 are rivets which project through holes 45 (FIG. 4) larger than the diameter of the rivets and formed in the free end portions of the beams. To insulate the lower plate 33 from the upper plate 34 and to establish the initial spacing of the plates, a cylindrical spacer 46 of a non-conductive material such as plastic surrounds each rivet 39 (FIG. 4) and is formed with axial shoulders 47 and 48 which abut the plates 33 and 34 respectively. Beyond the shoulders are reduced end portions which fit fairly snugly in the holes 45 in the beams. The ends of the rivets are upset to form heads 49 and 50 and non-conductive washers 51 are disposed between the heads and the plates. Thus, the rivets 39, the spacers 46 and the washers 51 rigidly connect each corresponding pair of beams 37 and 38 on the plates 33 and 34 and also electrically insulate the plates from each other. As a result, the plates are those of the capacitance transducer 17 with the space between them being the dielectric of the transducer.

Figure 5:
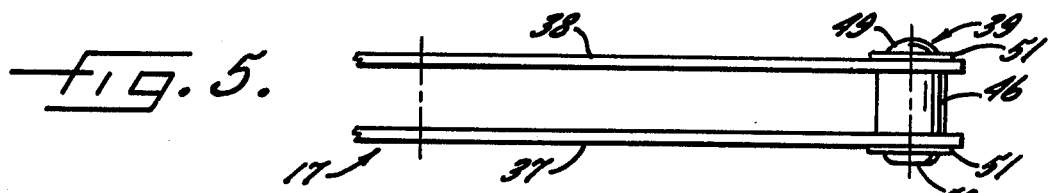
FIG. 5 is an enlarged fragmentary sectional view taken along the line 5—5 in FIG. 3.
Figure 6:
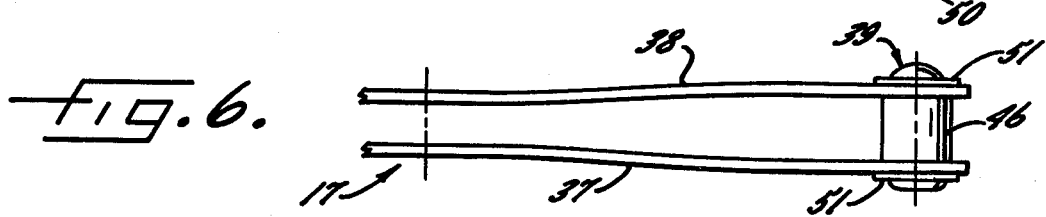
FIG. 6 is a view similar to FIG. 5 but showing the parts in a moved position.
Figure 7:
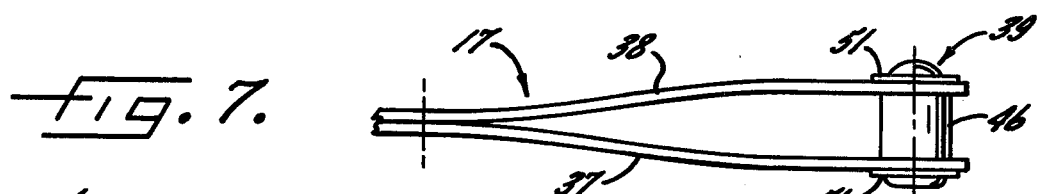
FIG. 7 is a view similar to FIG. 5 but showing the parts in a further moved position.

In order that the levers 18 apply the force on the platform 15 centrally to the upper plate 34, a casting 52 having a downwardly facing surface 53 is disposed above the upper plate which is engaged by the surface 53 and the casting is centered relative to the upper plate by a cylindrical boss 54. The latter is coaxial with the boss 43 and projects down into a hole 55 in the center of the upper plate 34. The upper side of the casting includes a peripheral flange 56 and the inner end portions 21 of the levers are fingers which bear against the top surface of the casting 52 inside the flange 56 so that the levers exert a force 30 proportional to the force applied to the platform. The force 30 bends the beams 37 and 38 and thereby changes the spacing between the plates 33 and 34 to a degree which change is almost exactly proportional to the force applied to the platform 15. The range of the scale is illustrated in FIGS. 5, 6 and 7 in which FIG. 5 shows zero deflection for no force on the platform, FIG. 6 shows an intermediate deflection for a force within the range of the scale and FIG. 7 shows the maximum range of the scale where the plates 33 and 34 engage each other. In practice, it has been found that the deviation of linearity between the force applied to the platform and the output of the transducer 17 is 0.0017 percent. For most practical applications, this accuracy is more than adequate but, in any event, even this small inaccuracy may be factored out by the micro-processor circuit 32.

Figure 8:
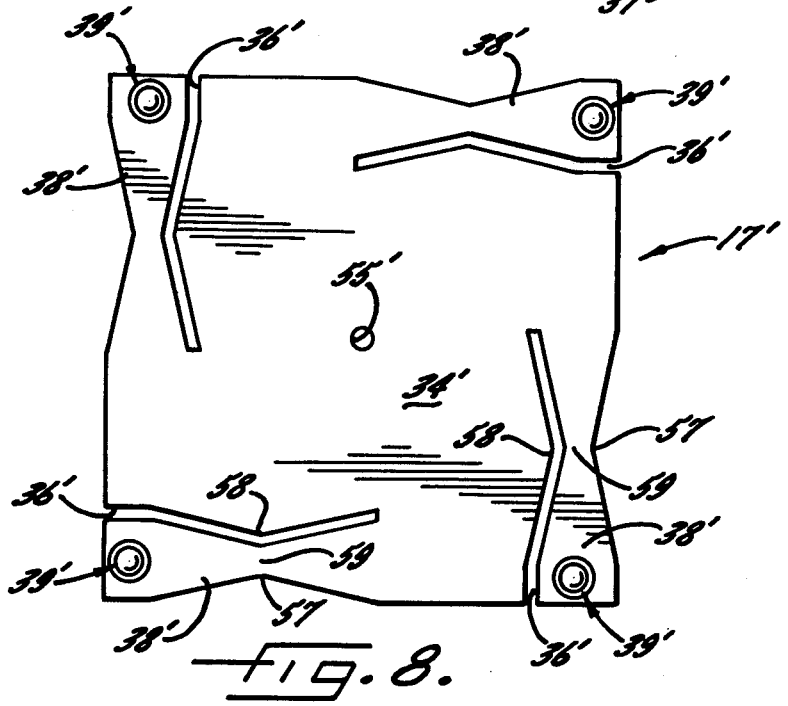
FIG. 8 is a plan view of a modified form of the capacitance transducer.

The modification shown in FIG. 8 reduces the deviation from straight linearity even more and, in this form, the corresponding parts are identified by the same but primed reference numerals. Basically, the structure of the transducer 17' is the same as that of the transducer 17 except that edges of the plates have shallow indentations 57 between the ends of the adjacent slots and the slots are reversely indented as indicated at 58 to provide the center of each beam with a necked-down portion 59. Depending upon the accuracy desired, this form may reduce the function of the micro-processor circuit 32 to eliminate whatever small deviation in linearity as may exist.

With the invention as illustrated in the drawings and described above, the linearity of the transducer 17 and the force applied to the platform are almost equal. Moreover, the transducer is virtually void of hysteresis effects. At the same time, the transducer is simple and inexpensive to manufacture and assemble.

I claim:

1. A platform scale comprising, a base, a platform disposed above said base, a capacitance transducer mounted on said base, and means to transmit a force applied to said platform to said transducer thereby to change the capacitance of the capacitor according to the magnitude of the force, said transducer having a first flat conductive plate which is polygonal in shape with all sides equal in length, a plurality of slots formed in said plate with one opening through each side of the plate and generally paralleling the adjacent side of the plate, said slots being shorter than the adjacent sides and all of the slots being spaced the same distance from their respective adjacent edges thereby to form a plurality of identical fingers equal in number to the number of edges on said plate, a second conductive plate identical to said first plate and disposed in a plane which is spaced from and parallel to the plane of the first plate, and fastening elements rigidly connecting the free end of each finger on said first plate to the free end of the corresponding finger of said second plate whereby the fingers act as cantilever beams, said plates being insulated from each other and the space between said plates being the dielectric of said transducer, said means being operable to transmit the force applied to the platform to the center of said first plate thereby to deflect said beams and change the space between said plates and hence the capacitance of said transducer proportionately to the magnitude of the force.

2. A platform scale comprising, a base, a platform disposed above said base, a capacitance transducer mounted on said base, and means to transmit a force applied to said platform to said transducer thereby to change the capacitance of the capacitor according to the magnitude of the force, said transducer having a first flat conductive plate which is square in shape, four slots formed in said plate with one opening through each side of the plate and generally paralleling the adjacent side of the plate, said slots being shorter than the adjacent sides and all of the slots being spaced the same distance from their respective adjacent edges thereby to form four identical cantilever beams, a second conductive plate identical to said first plate and disposed in a plane which is spaced from and parallel to the plane of the first plate, and fastening elements rigidly connecting the free end of each beam on said first plate to the free end of the corresponding beam of said second plate, said plates being insulated from each other and the space between said plates being the dielectric of said transducer, said means being operable to transmit the force applied to the platform to the center of said first plate thereby to deflect said beams and change the space between said plates and hence the capacitance of said transducer proportionately to the magnitude of the force.

3. A platform scale as defined in claim 2 in which the sides of said plates are straight and said slots are straight whereby said beams are rectangular.

4. A platform scale as defined in claim 2 in which each edge of each of said plates is indented adjacent the center of the beam associated with the edge and each of said slots is reversely indented at the same place along the associated beam whereby the center portions of said beams are necked down.

5. A platform scale comprising, a flat horizontal base generally square in shape, a generally square horizontal platform disposed above said base, a capacitance transducer assembly mounted on said base at the center thereof, four elongated levers fulcrumed on said base, one of said levers being fulcrumed adjacent each corner of said base and said levers extending diagonally inwardly to bear on the top of said assembly, means supporting said platform on said levers whereby the levers exert a force on said assembly proportional to a force applied to said platform, said assembly comprising a bracket fixed to the center of said base and having an upwardly facing surface, a lower flat conductive plate resting on and centered relative to said surface, an upper flat conductive plate parallel to and spaced from said lower plate, spacing means holding said plates in spaced relation, and a transmitting member engaging the upper side of said upper plate at the center thereof, the inner ends of said levers bearing against the top of said member whereby a force applied to said platform is transmitted to said plates, said lower plate being square and having four slots, one opening through each edge of the plate and spaced inwardly from the adjacent edge of the plate thereby to define four identical cantilever beams, said upper plate being identical to said lower plate and being oriented relative to said base the same as the lower plate, said spacing means including four elongated fastening elements with each connecting the free end of a beam on said lower plate with the free end of the corresponding beam on said upper plate, a spacer of non-conductive material encircling each of said fastening elements with its ends abutting said lower and upper plates respectively, and washers of non-conductive material insulating said fastening elements from said plates, the space between said plates being the dielectric of said transducer and changing as said beams deflect due to a load applied to said platform whereby the capacitance of the transducer is proportional to the force.

6. A platform scale as defined in claim 5 in which said plates are formed with holes at their centers, a first boss projects upwardly from said upwardly facing surface and into the hole in said lower plate, and a second boss projects downwardly from said transmitting member and into the hole in said upper plate whereby said bosses center said plates relative to said boss and said platform.

* * * * *